(12) United States Patent
Moulik et al.

(10) Patent No.: US 12,166,313 B2
(45) Date of Patent: Dec. 10, 2024

(54) SELF-ALIGNING HOLSTER FOR J1772 PLUG USED IN ELECTRIC VEHICLE SUPPLY EQUIPMENT

(71) Applicant: SemaConnect Inc., Bowie, MD (US)

(72) Inventors: Dyutiman Moulik, Karnataka (IN); Rajat Hegde, Karnataka (IN); Ghouse Ali, Karnataka (IN)

(73) Assignee: Blink Charging Co., Bowie, MD (US)

( * ) Notice: Subject to any disclaimer, the term of this patent is extended or adjusted under 35 U.S.C. 154(b) by 183 days.

(21) Appl. No.: 17/480,278

(22) Filed: Sep. 21, 2021

(65) Prior Publication Data

US 2023/0106493 A1    Apr. 6, 2023

(51) Int. Cl.
*H02J 7/00* (2006.01)
*B60L 53/16* (2019.01)
(Continued)

(52) U.S. Cl.
CPC .............. *H01R 13/60* (2013.01); *B60L 53/16* (2019.02); *H01R 13/6272* (2013.01); *H02J 7/0042* (2013.01); *H01R 2201/26* (2013.01)

(58) Field of Classification Search
CPC ..... H01R 13/60; B60L 53/16; B60L 2200/12; B60L 50/20; B60L 2270/36; B60L 50/64; B60L 2200/24; B60L 50/66; B60L 53/305; B60L 53/18; B60L 53/80; B60L 50/60; B60L 2270/34; B60L 53/68; B60L 53/65; B60L 2250/16; B60L 2270/32; B60L 53/31; B60L 58/10; B60L 58/12; B60L 2200/20; B60L 2240/461; B60L 2240/54; B60L 2240/62; B60L 2240/622; B60L 2250/12; B60L 3/0069; B60L 3/04; B60L 53/66; B60L 7/10; B60L 15/2009; B60L 2240/12; B60L 2240/14; B60L 2240/68; B60L 3/12; B60L 53/302; B60L 53/62; B60L 53/665; B60L 58/13; B60L 58/16; B60L 7/02; B60L 15/20; B60L 2200/16; B60L 2200/22; B60L 2240/545; B60L 2240/547; B60L 2240/549; B60L 2240/70; B60L 2240/72; B60L 2240/80; B60L 2250/10; B60L 2250/20; B60L 3/0046; B60L 53/14; B60L 53/35; B60L 53/36; B60L 53/50; B60L 53/51; B60L 53/53; B60L 53/57; B60L 53/67; B60L 58/18; B60L 2210/30; B60L 53/122; B60L 53/124; B60L 53/126; B60L 58/15;
(Continued)

(56) References Cited

U.S. PATENT DOCUMENTS

| 8,025,526 B1* | 9/2011 | Tormey | ............. H01R 13/6397 439/372 |
| 2012/0091961 A1* | 4/2012 | Hani | ...................... B60L 53/65 320/109 |

* cited by examiner

*Primary Examiner* — Binh C Tat
(74) *Attorney, Agent, or Firm* — Robert Babayi; Vector IP Law Group

(57) ABSTRACT

An electric vehicle charger for charging a vehicle has a housing. A holster is fixedly attached to the housing having a latch partition and a plug partition. The plug partition houses a plug latch. A plug having a male charging connector is inserted into the hosung, where a spring-loaded latch positioned on a male charging connector engages and disengages the plug latch. The plug partition has a curvature that allows the plug to be inserted into the holster at an angle for engaging the spring-loaded latch with the plug latch. The spring-loaded latch disengages from the plug latch by a radial movement along the path of the curvature.

2 Claims, 9 Drawing Sheets

(51) Int. Cl.
*H01R 13/60* (2006.01)
*H01R 13/627* (2006.01)

(58) Field of Classification Search
CPC .......... B60L 53/12; B60L 53/30; B60L 58/21;
B60L 1/08; B60L 2200/26; B60L
2240/662; B60L 50/52; B60L 58/14;
B60L 58/27; H02J 7/0042; H02J 7/0047;
H02J 7/00032; H02J 7/1446; H02J
7/0013; H02J 7/0044; H02J 7/0045; H02J
2310/46; H02J 2310/48; H02J 9/005;
H02J 50/10; H02J 7/02; H02J 50/12;
H02J 50/50; H02J 7/00304; H02J
7/00308; H02J 50/80; H02J 50/60; H02J
50/70; H02J 50/90; H02J 7/00; H02J
7/00302; H02J 50/005; H02J 50/502;
H02J 50/40; H02J 50/402; H02J 2310/40
USPC ................................................ 320/108–115
See application file for complete search history.

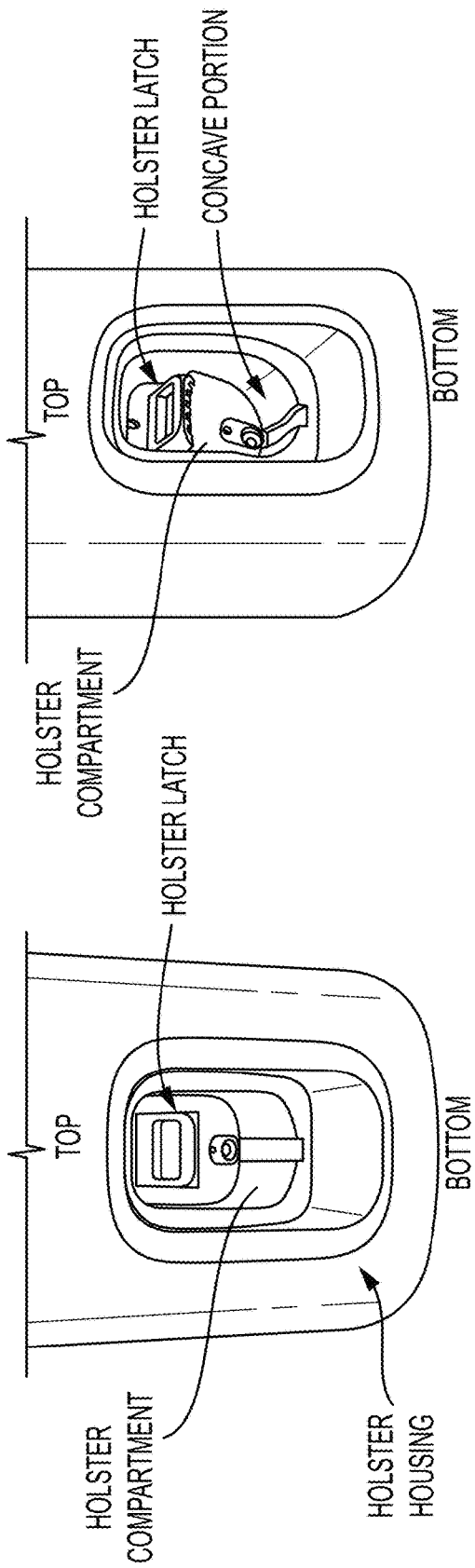
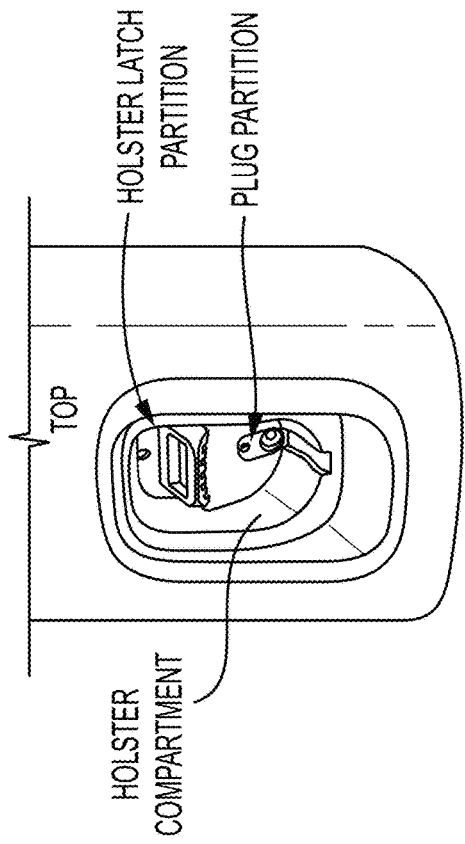
FIG. 5A
FIG. 5B
FIG. 5C

SELF-ALIGNING HOLSTER FOR J1772 PLUG USED IN ELECTRIC VEHICLE SUPPLY EQUIPMENT

FIELD OF INVENTION

The present invention generally relates to the field of electric vehicle supply equipment (EVSE) and, more particularly, to a bolster for docking a J1772 plug that supplies electricity used to charge electric vehicles (EVs).

BACKGROUND

Recent years have seen the spread of EVs that run on motors powered by electricity. Such EVs use battery packs that store energy supplied to the electric motors. These battery packs may be recharged via an outlet wired to a single phase 110-volt or 240-volt power line of alternating current for what is known in the industry as Level-1 or Level-2 charging.

FIG. 1 shows a perspective view of a prior art EVSE used for charging EVs. The EVSE has an enclosure that houses, among other things, LED (light emitting diode) lights, a display screen (for example, liquid crystal display) and an authentication interface, which is configured to capture identifying information associated with an EV and/or a driver. The EVSE also includes a cable of a particular length that ensures easy charging access over and around EVs. The EVSE may include a bracket for a coiling/storing cable after a charging session (i.e., after charging of a vehicle). A holster accepts a standard J1772 plug connected to the cable, which supplies the Level-1 or Level-2 charge current to EVs.

FIG. 2 is a partial perspective view of a prior art plug assembly. The plug assembly includes a housing for a standard plug having male contacts, which supply charge current to complementary female jack contacts on EVs. The shown plug and jack are compliant with the J1772 standard, which defines how EVSE connects with, communicates with, and charges EVs. For charging EVs, the J1772 plug is channeled by a guide inserted into a complementary trough disposed on the J1772 jack, which has a latch for engaging a standard plug latch positioned on the plug housing. As shown in FIG. 2, the plug latch is spring-loaded by a fulcrum at a suitably positioned point where it pivots around a loaded spring. The plug latch can be activated by a button to engage and disengage the J1772 plug and jack from each other.

There are various prior art implementations of the mechanical interface between J1772 plugs and EVSE holsters.

FIG. 3A shows one implementation of a prior art EVSE holster with a fixed-type female profile. In this arrangement, a user docks the standard J1772 plug shown in FIG. 2 by inserting it into the EVSE holster along the line of entry/exit (shown with dotted line). In this prior art implementation, the button shown in FIG. 2 must be pressed to engage and disengage the J1172 plug from the EVSE holster.

FIG. 3B is a side view of a charger assembly showing a prior art EVSE holster with a swivel-type female holster profile. This holster by ChargePoint uses a multipart swivel mechanism with the fixed-type female profile. Like the holster shown in FIG. 3A, a plug button must be pressed to disengage the plug from this EVSE holster.

However, there is a need for a simpler and more cost-effective EVSE mechanism that provides EVSE users with a better docking/undocking experience.

SUMMARY OF INVENTION

Briefly, according to one embodiment of the present invention, an EVSE holster assembly for docking and undocking an EVSE plug assembly has a plug used to charge an EV via a complementary jack located on the EV and a spring-loaded plug latch that engages to and disengages from a complementary jack. The EVSE holster assembly comprises a holster housing that receives the EVSE plug assembly. The EVSE plug assembly has a top side and a bottom side where the top side of the holster housing is part of a holster latch partition and the bottom side of the holster housing is part of a plug partition. A holster latch is fixed within the latch partition for docking engagement and undocking disengagement with the spring-loaded plug latch based on radial movements of the EVSE plug assembly within the holster housing. The bottom side of the plug partition has a concaved portion that provides a path for a curvilinear motion of the EVSE plug assembly within the holster housing.

An electric vehicle charger for charging a vehicle has a housing. A holster is fixedly attached to the housing having a latch partition and a plug partition. The plug partition houses a plug latch. A plug having a male charging connector is inserted into the hosing, where a spring-loaded latch positioned on a male charging connector engages and disengages the plug latch. The plug partition has a curvature that allows the plug to be inserted into the holster at an angle for engaging the spring-loaded latch with the plug latch. The spring-loaded latch disengages from the plug latch by a radial movement along the path of the curvature.

BRIEF DESCRIPTION OF THE DRAWINGS

FIGS. 5A, 5B and 5C are respectively front perspective, left perspective and right perspective views the holster assembly used in the EVSE shown in FIGS. 4A and 4B.

DETAILED DESCRIPTION OF THE INVENTION

As explained below, the present invention relates to an EVSE holster used for docking an EV charging plug that provides the ergonomic advantage of self-aligning such plug when it is inserted into the EVSE holster. For example, the user experience is simplified by circumventing the need to press a button to disengage the plug from the EVSE holster.

Figure 1:
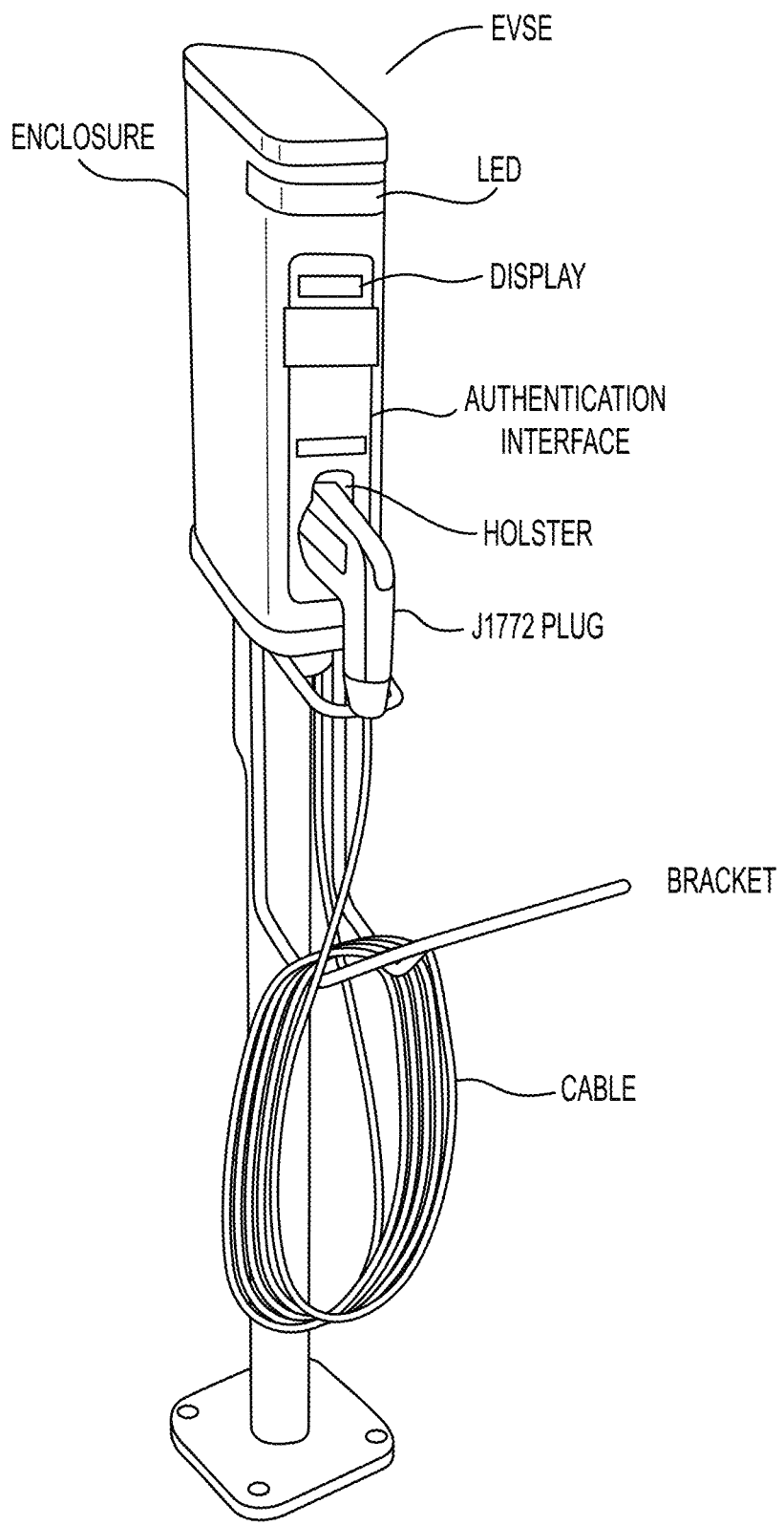
FIG. 1 shows a perspective view of a prior art EVSE.
Figure 2:
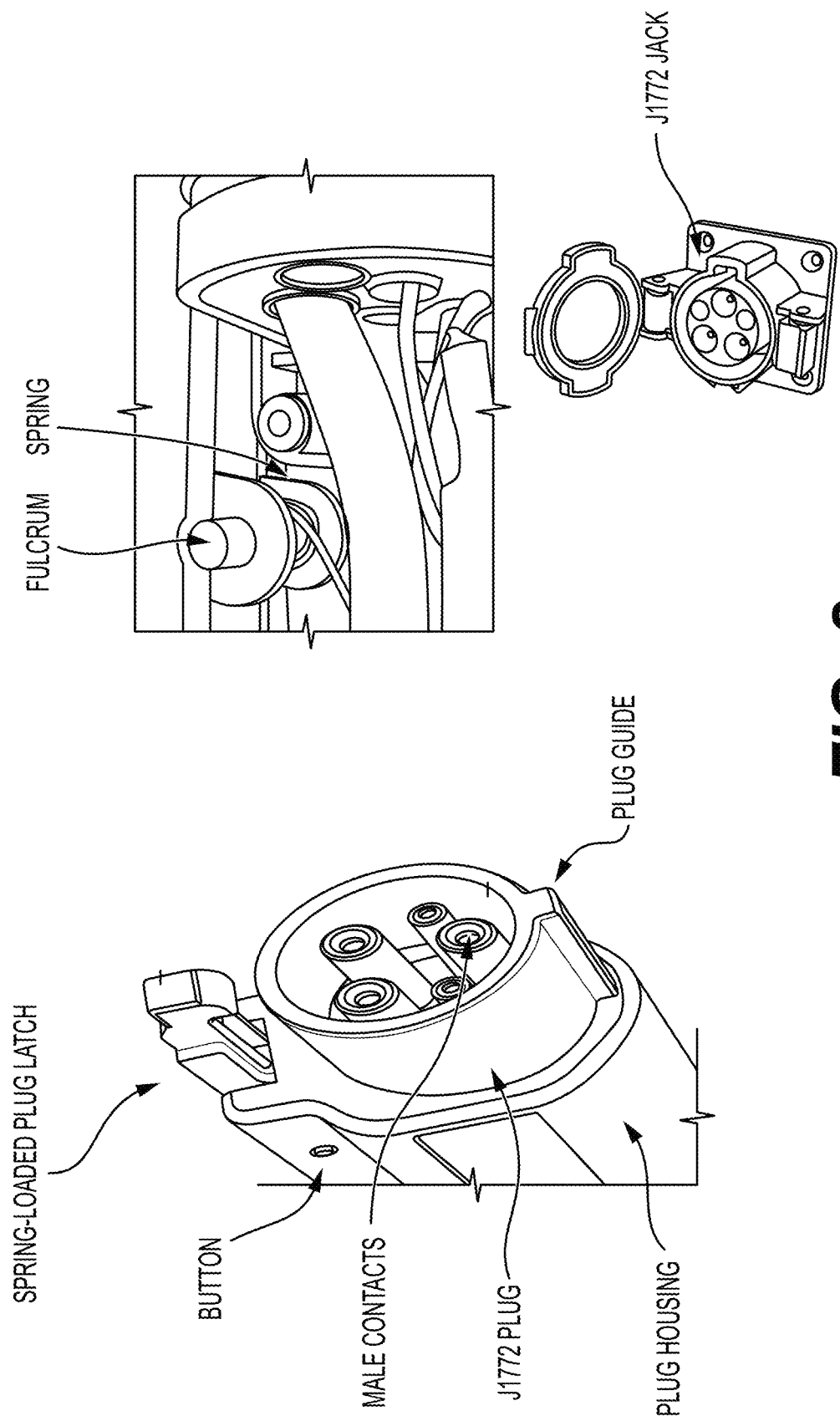
FIG. 2 is a partial perspective view of a standard J1772 plug and jack.
Figure 3B:
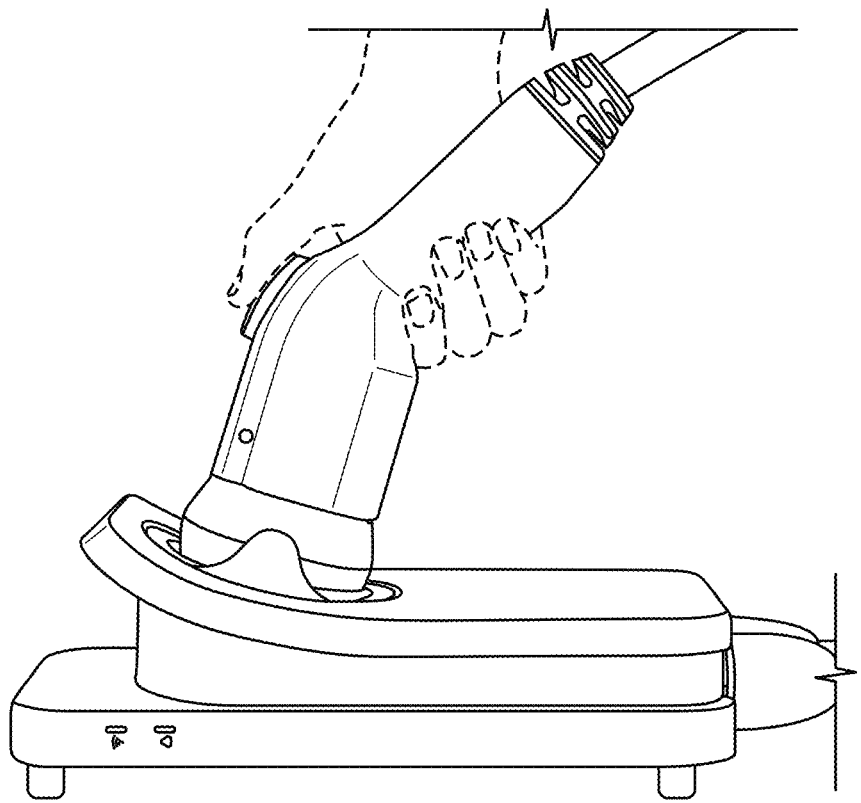
FIG. 3B is a perspective view of another implementation of a prior art EVSE holster having a swivel-type female holster profile.
Figure 3A:
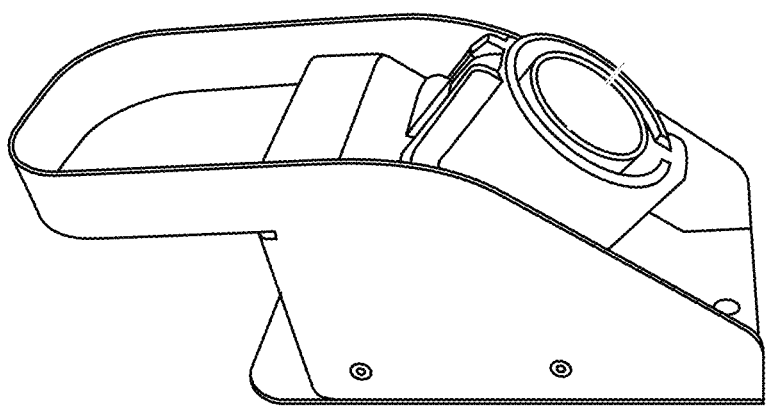
FIG. 3A is a perspective view of one implementation of a prior art EVSE holster having a fixed-type female profile.
Figure 4A:
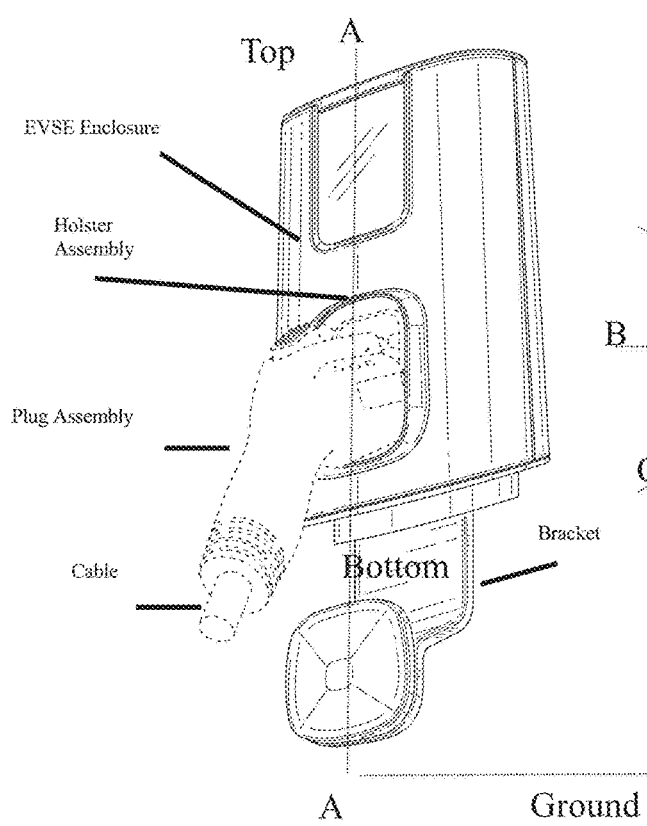
FIG. 4A is a perspective view of an EVSE assembly used for charging EVs.

FIG. 4A is a perspective view of an EVSE depicting a top side and a bottom side along an axis A-A, which is perpendicular to ground. The EVSE manages the link from a power grid or household power to an EV via a cable attached to a plug that is insertable into an EVSE holster when docked and removable from the EVSE holster when undocked. A bracket holds the cable when the plug is docked. In one embodiment, the EVSE can be affixed to a wall for use at home or garage, where an enclosure holds a holster assembly that receives a plug assembly. In one example, the plug used in the plug assembly complies with the J1772 standard, as shown in FIG. 2.

Figure 4B:
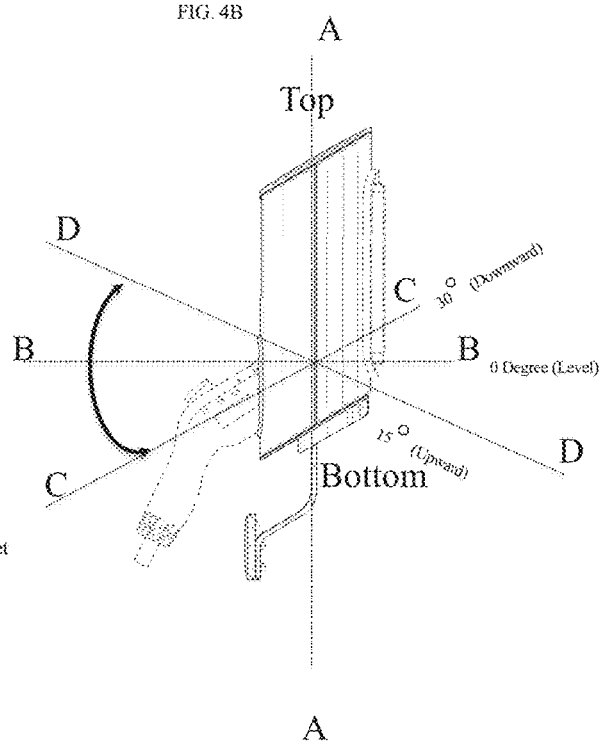
FIG. 4B is a side view of the EVSE assembly depicting its orientation lines.

FIG. 4B is a side view of the EVSE depicting its orientation lines. As shown, the horizontal axis B-B of the EVSE at position parallel to ground is referenced at a 0° degree angle. In one embodiment, the plug assembly when docked is positioned along an axis C-C, which has a downward 30° angle. For undocking in this example, the plug assembly can radially move to an upward 15° angle along a D-D axis. After undocking, the plug assembly can radially move to be positioned along the C-C axis. In other words, the radial movement range of the plug assembly for docking and undocking is 45°.

FIGS. 5A, 5B and 5C are respectively front perspective, left perspective and right perspective views the holster assembly used in the EVSE shown in FIGS. 4A and 4B. As shown, the holster assembly includes a housing and a latch disposed within a compartment formed by the housing. The holster housing receives the EVSE plug assembly within its compartment. The top side of the holster housing is part of a holster latch partition and the bottom side of the holster housing is part of a plug partition. The holster latch is fixed within the latch partition for docking engagement and undocking disengagement based on radial movements of the EVSE plug assembly within the holster housing. The bottom side of the plug partition has a concaved portion that is hollowed out or rounded inward where the bottom side surfaces "cave" in towards the ground. As further described below the concaved portion provides a curved path for a curvilinear motion of the EVSE plug assembly within the holster housing.

Figure 6:
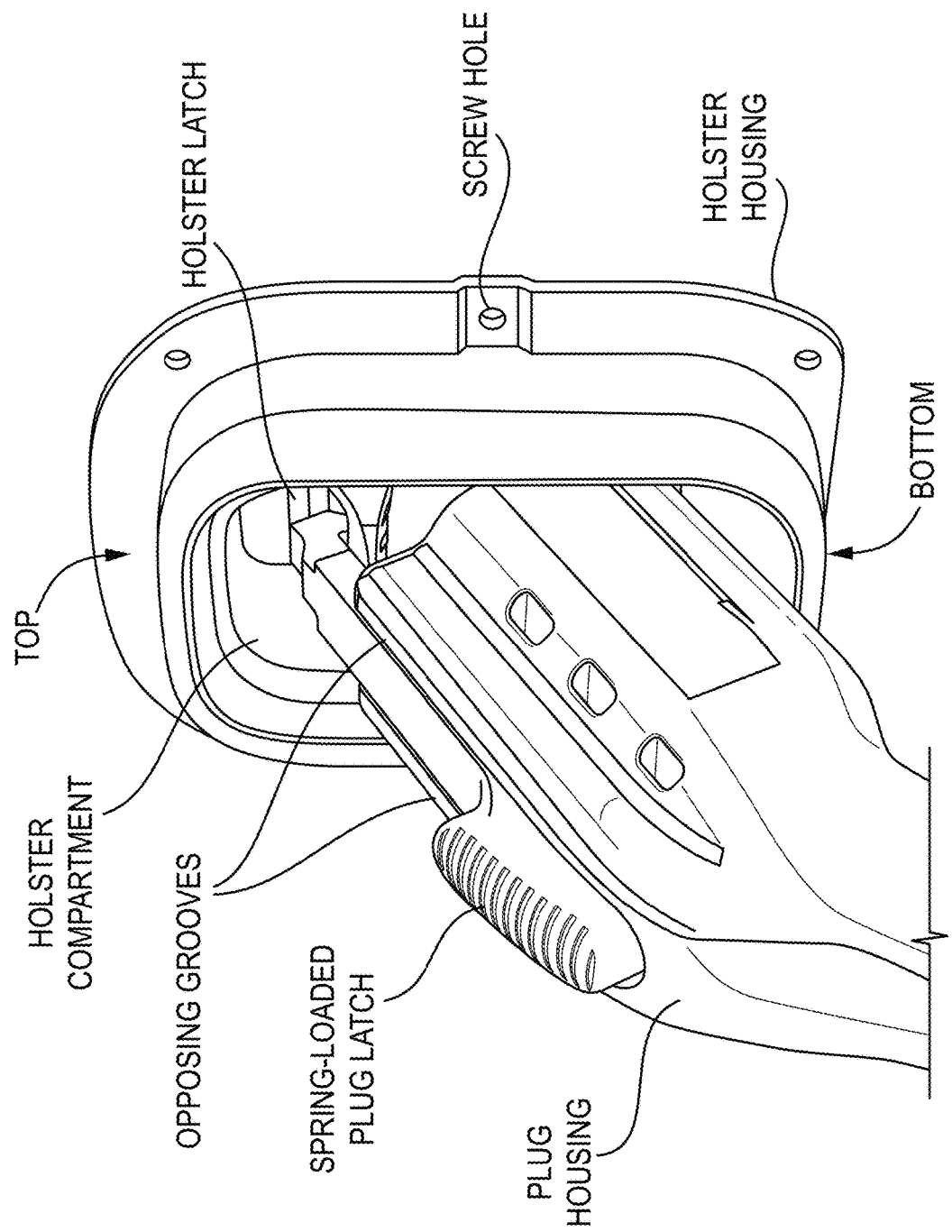
FIG. 6 is a perspective view of a plug assembly docked at an EVSE holster assembly according to the present invention.

FIG. 6 is a perspective view of the plug docked at the EVSE holster shown in FIG. 4A and FIG. 4B. In one embodiment, the EVSE holster is part of the holster assembly shown in FIGS. 5A-5C, and the plug is part of a plug assembly. The holster and plug assemblies are made of molded parts, for example, parts made of plastic or any other suitable material having a solid and rigid state. In one embodiment, the holster is made of ABS plastic and the holster latch is glass-filled nylon. As described in connection with FIGS. 5A-5C, the parts used in the holster assembly include the holster housing that holds the holster latch in a fixed place. The parts of the plug assembly include a plug housing that houses the J1772 plug shown in FIG. 2 and holds a spring-loaded plug latch within opposing grooves formed on the plug housing. For attachment to the EVSE, the holster housing can, for example, be screwed to the enclosure shown in FIG. 4 via screw holes, thereby fixing the holster compartment shown in FIGS. 5A-5C on the EVSE for inserting or otherwise receiving the J1772 plug. According to the present invention, for undocking the plug before charging the EV and docking the plug after charging the EV, the holster latch engages and disengages with the spring-loaded plug latch through forward and backward curvilinear motions as further described below.

Figure 7:
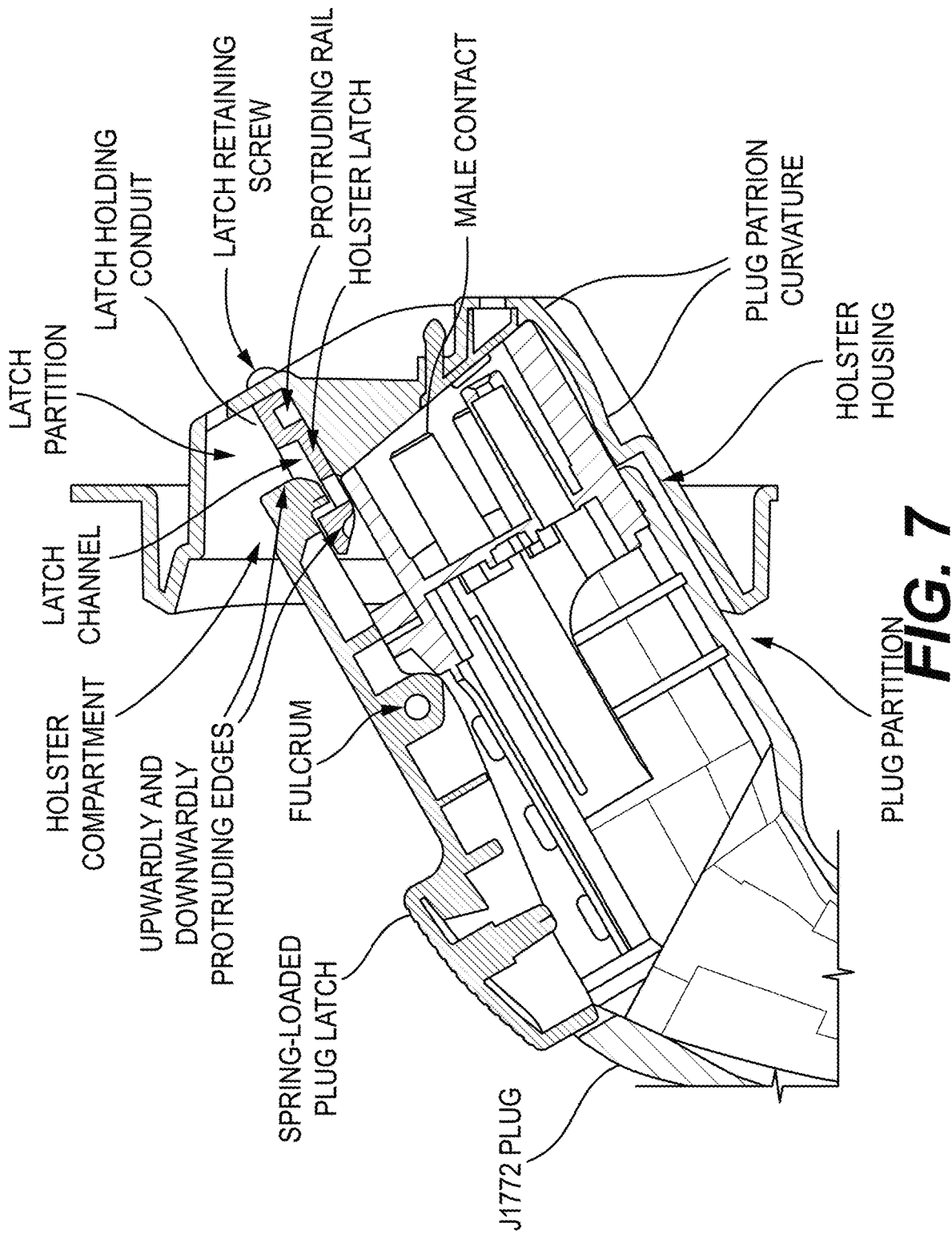
FIG. 7 is a sectional view of FIG. 6 depicting the EVSE holster assembly according to the present invention.

FIG. 7 is a sectional view of FIG. 6 depicting the holster housing being partitioned into a latch partition formed on top of a plug partition. The holster latch is secured to a fixed point within the latch partition by a retaining screw and a fixed protruding rail formed on the holster housing, which engages a complementary holding conduit formed on the holster latch, as shown in FIG. 7. Also formed on the holster latch is a channel between a latch-holding conduit and an upwardly protruding edge of the holster latch, which engages a complementary downwardly protruding edge of the spring-loaded plug latch when the plug is docked by insertion into the holster housing.

According to the present invention, the bottom side of the holster housing has a curvature in the form of a downwardly curved portion within the plug partition, which causes plug self-alignment within the holster housing. In this way, the curved portion allows for forward and backward curvilinear motions of the J1772 plug within the plug partition. To take advantage of the self-alignment feature of the invention, the J1772 plug is insertable into the holster housing at an angle that engages the spring-loaded plug latch with the holster latch. The holster latch channel allows the downwardly protruding edge to move freely back and forth. The spring-loaded plug latch disengages from the holster latch by a radial movement along the path of the curvature. This results in a curvilinear motion of the J1772 plug, which moves along a curved path within the plug partition of the holster housing in a self-aligning manner.

Figure 8B:
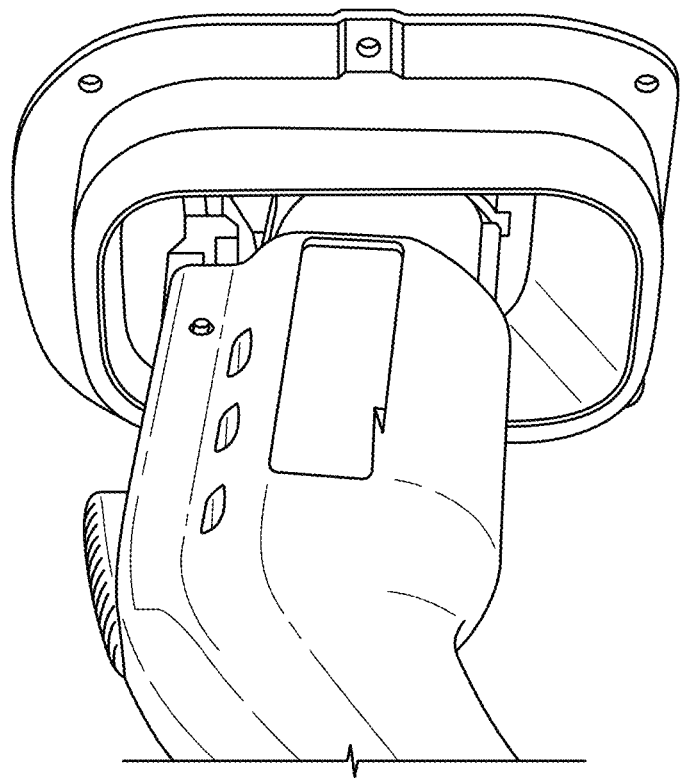
FIG. 8A and FIG. 8B are, respectively, sectional and perspective views depicting curvilinear movement according to the present invention of the J1772 plug in the middle of the EVSE holster housing of the present invention.
Figure 8A:
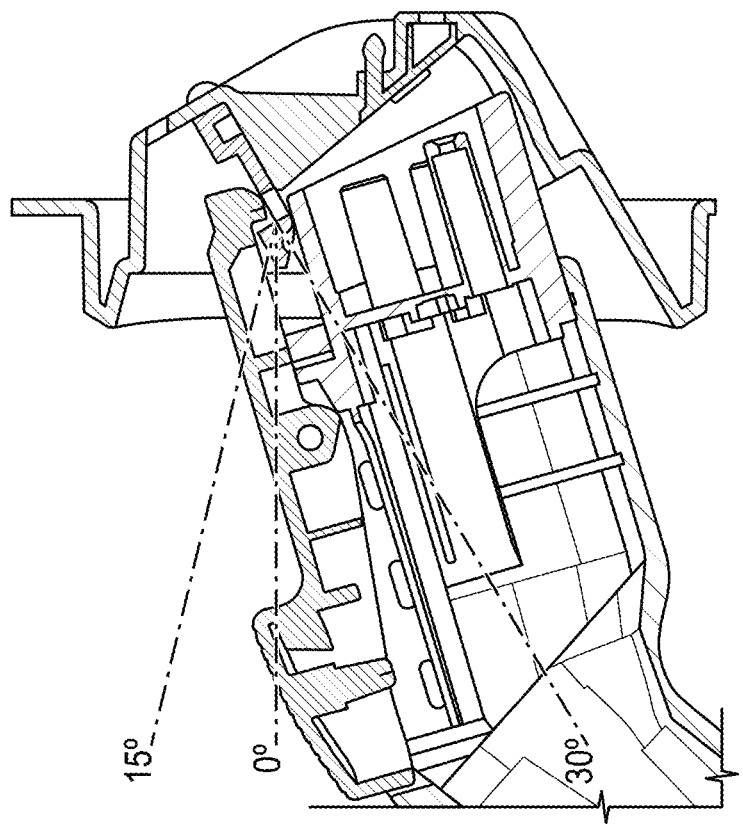

FIG. 8A and FIG. 8B are, respectively, sectional and perspective views depicting curvilinear movement, according to the present invention, of the J1772 plug in the middle of the holster housing. This depiction assumes the fixed-level position of the EVSE to the ground is at a 0° angle. In the shown exemplifying arrangement, the holster housing is attached to the EVSE in a way that positions the plug partition at a downward angle of 30° towards the ground. This downward angle is the rest angle of the inserted J1772 plug when docked by full engagement of the spring-loaded plug latch with the holster latch, as shown in FIG. 7. For undocking, FIG. 8A and FIG. 8B show an upward radial movement of the J1772 plug, which causes the spring-loaded plug latch to lift its downward protruding edge against the holster latch's fixed upward protruding edge, while the J1772 plug travels along the curved path within the plug partition of the holster housing. This curved path provides a free space that facilitates the upward radial movement of the J1772 plug before it is undocked.

Figure 9B:
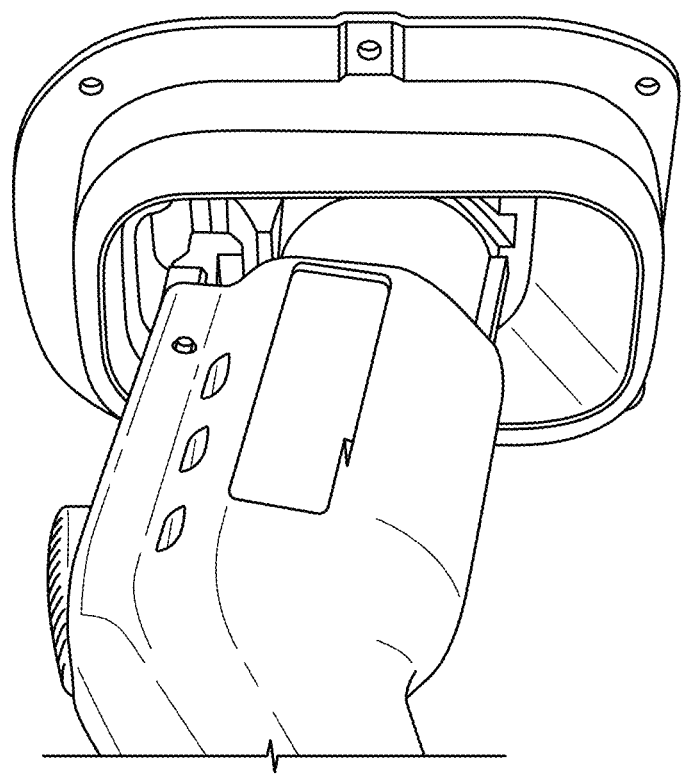
FIG. 9A and FIG. 9B are, respectively, sectional and perspective views depicting curvilinear movement according to the present invention of the J1772 plug outside of the EVSE holster housing of the present invention.
Figure 9A:
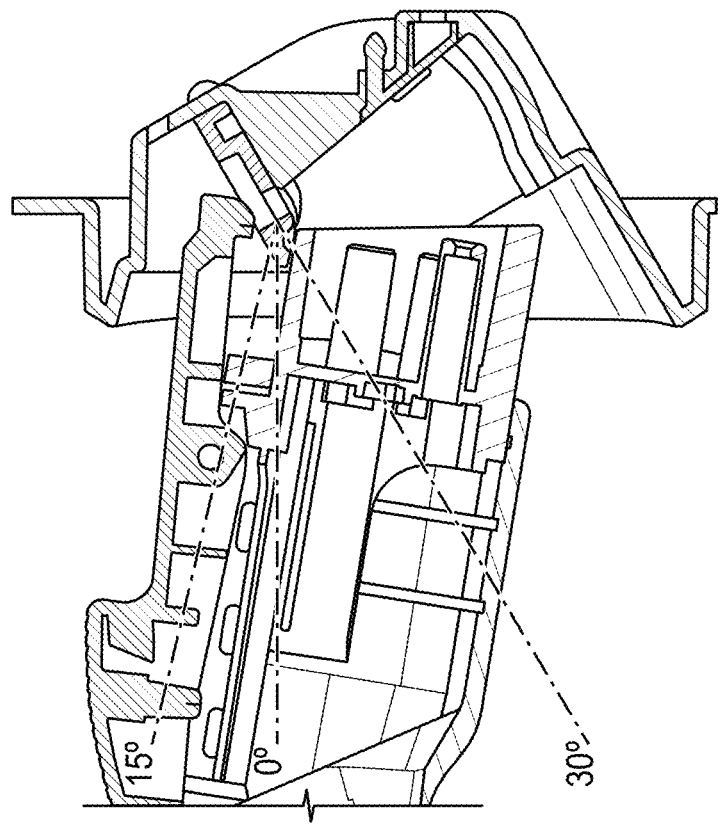

FIG. 9A and FIG. 9B are, respectively, sectional and perspective views depicting curvilinear movement, according to the present invention, of the J1772 plug outside of the holster housing after it is undocked. As can be seen for full disengagement and engagement of the spring-loaded plug latch with the holster latch lug, the radial movement upward reaches the upward 15° angel which completes the J1772 plug's travels along the curved path outside of the plug partition.

Based on the foregoing, it should be appreciated that the present invention provides a self-aligning holster solution, which improves user experience during docking and undocking of the J1772 plug. The radial upward and downward movements facilitated by the above-described curvature path result in curvilinear motion of the plug in the self-aligning holster, providing a simple and cost-effective solution for circumventing the need to actuate a button to dock or undock the J1772 plug.

The invention claimed is:

1. An EVSE holster assembly for docking and undocking a plug assembly having a J1772 plug used to charge an EV via a complementary jack located on the EV and a spring-loaded plug latch that engages to and disengages from a complementary jack, the EVSE holster comprising:
   a. a holster housing that receives the plug assembly having a top side and a bottom side, wherein the top side of the holster housing is part of a holster latch partition, and the bottom side of the holster housing is part of a plug partition, and
   b. a holster latch fixed within the latch partition, the holster latch being used for docking engagement and undocking disengagement with the spring-loaded plug latch based on radial movements of the EVSE plug assembly within the holster housing, wherein bottom side of the plug partition has a concaved portion that provides a path for a curvilinear motion of the plug assembly within the holster housing, wherein the plug assembly is insertable into the holster housing at a downward angle that engages the spring-loaded latch with the plug latch, and wherein the spring-loaded latch disengages from the plug latch by a radial movement having an upward angel.

2. An electric vehicle charger for charging a vehicle having a charger housing, comprising:
   a. a holster having a top side and a bottom side fixedly attached to the charger housing, wherein the top side forms part of a latch partition and the bottom side a forms part of a plug partition, the bottom side having a concaved portion that forms a curved path on the bottom side;
   b. a holster latch fixedly positioned within the latch partition;
   c. a plug having a male charging connector that positions a spring-loaded latch, wherein the spring-loaded latch engages and disengages the plug latch within the latch partition, wherein the plug is insertable into the holster at an angle to engage the spring-loaded latch with the plug latch, and wherein the spring-loaded latch disengages from the plug latch by a radial movement along the curved path, wherein the plug assembly is insertable into the holster housing at a downward angle that engages the spring-loaded latch with the plug latch, and wherein the spring-loaded latch disengages from the plug latch by a radial movement having an upward angel.

* * * * *